United States Patent
Yoo et al.

(10) Patent No.: US 12,275,361 B2
(45) Date of Patent: Apr. 15, 2025

(54) SEAT POWER SUPPLY DEVICE FOR VEHICLE AND POWER SUPPLY METHOD USING THE SAME

(71) Applicants: HYUNDAI MOTOR COMPANY, Seoul (KR); KIA CORPORATION, Seoul (KR)

(72) Inventors: So Young Yoo, Suwon-si (KR); Sang Ho Kim, Incheon (KR); Seok Hwan Kim, Suwon-si (KR); Seon Chae Na, Yongin-si (KR); Young Bok Sung, Hwaseong-si (KR); Hyeong Jong Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 714 days.

(21) Appl. No.: 17/541,732

(22) Filed: Dec. 3, 2021

(65) Prior Publication Data

US 2022/0379827 A1    Dec. 1, 2022

(30) Foreign Application Priority Data

May 26, 2021   (KR) .......................... 10-2021-0067394

(51) Int. Cl.
*B60R 16/00*    (2006.01)
*B60R 16/033*   (2006.01)
*H01B 5/00*     (2006.01)

(52) U.S. Cl.
CPC .............. *B60R 16/033* (2013.01); *H01B 5/00* (2013.01)

(58) Field of Classification Search
CPC ................................ B60R 16/033; H01B 5/00
See application file for complete search history.

(56) References Cited

U.S. PATENT DOCUMENTS

2019/0367194 A1   12/2019  Oh et al.
2020/0108737 A1*   4/2020  Runde .................. B60N 2/0707

FOREIGN PATENT DOCUMENTS

| JP | 2006-321395 A | 11/2006 |
| JP | 2007-128678 A | 5/2007 |
| JP | 2007-128683 A | 5/2007 |
| JP | 2015-134513 A | 7/2015 |
| KR | 2009-0001609 A | 1/2009 |
| KR | 10-1014529 B1 | 2/2011 |

* cited by examiner

*Primary Examiner* — Phuong Chi Thi Nguyen
(74) *Attorney, Agent, or Firm* — MCDONNELL BOEHNEN HULBERT & BERGHOFF LLP

(57) ABSTRACT

The present disclosure relates to a power supply device, and more specifically, to a seat power supply device including an improved power supply structure for a vehicle seat. The seat power supply device includes a pogo pin assembly fixed to a vehicle and electrically connected to a power source; and a distribution element electrically connected to the pogo pin assembly and configured to supply power from the power source to an electronic part of a seat.

16 Claims, 10 Drawing Sheets

FIG. 1 "Prior Art"
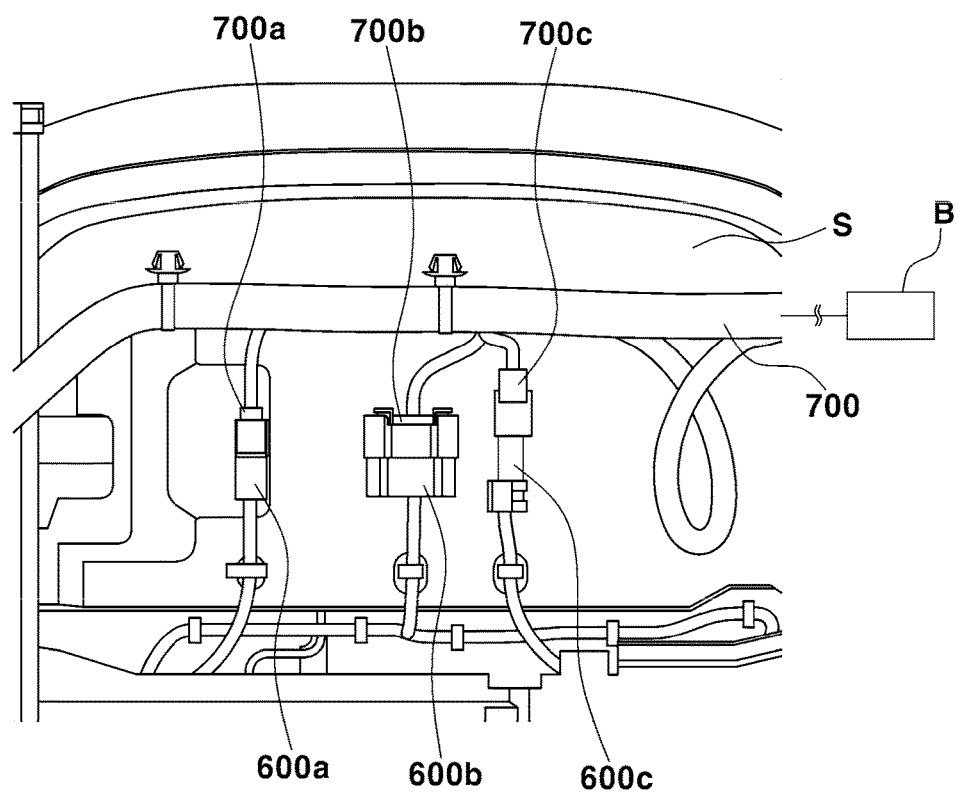
FIG. 2
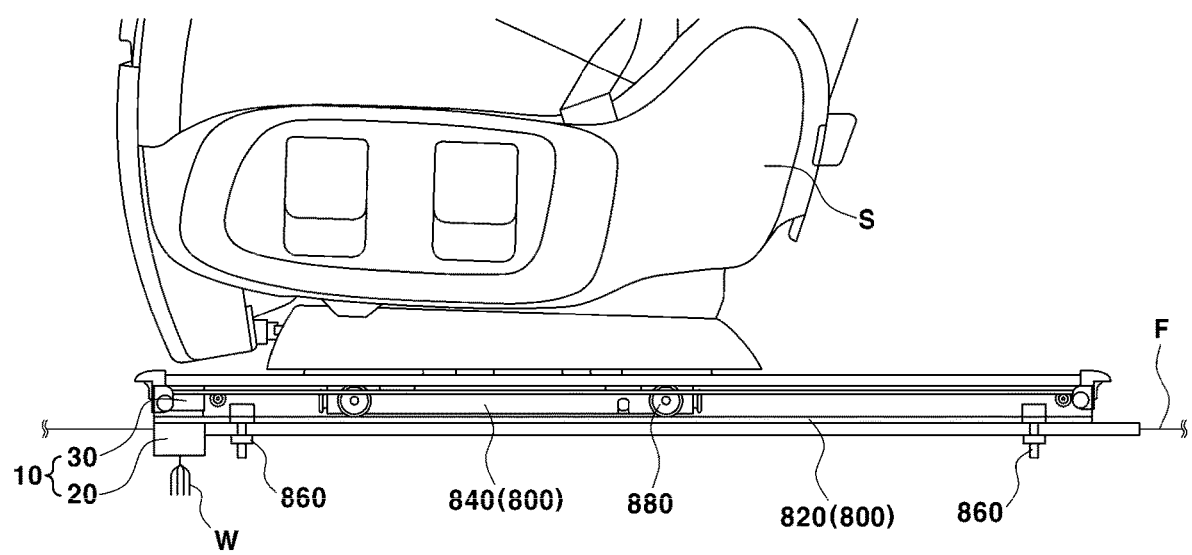

SEAT POWER SUPPLY DEVICE FOR VEHICLE AND POWER SUPPLY METHOD USING THE SAME

CROSS REFERENCE TO RELATED APPLICATIONS

This application claims under 35 U.S.C. § 119(a) the benefit of priority to Korean Patent Application No. 10-2021-0067394, filed on May 26, 2021, the entire contents of which are incorporated herein by reference.

BACKGROUND

(a) Technical Field

The present disclosure relates to a power supply device and, more specifically, to a seat power supply device including an improved seat power supply structure for a vehicle.

(b) Background Art

A vehicle seat is mounted with various parts (hereinafter referred to as electronic parts) requiring power supply, such as a motor for an electronic seat, a side airbag, and a seatbelt reminder sensor. These electronic parts are generally configured to receive power from a battery for the vehicle. For the power supply from the battery, wirings extend to the seat through a floor for the vehicle, and these electronic parts are connected to the seat side wirings through connectors under the seat.

As illustrated in FIG. 1, in the prior art, seat wiring connectors 600a, 600b, 600c are connected to a wire connected to each electronic part such that power is individually supplied to each electronic part of a seat (S). The seat wiring connectors 600a, 600b, 600c should be connected to body wiring connectors 700a, 700b, 700c, respectively, branched from a body wiring harness 700 extending from a battery (B). Further, to fasten the connector, various parts and accessories (e.g., a connector bracket and a side rail bracket) are required. Therefore, such a structure results in an increase in manufacturing cost, increases the number of operations in an assembling process of the body wiring connectors 700a, 700b, 700c and the seat wiring connectors 600a, 600b, 600c, and sometimes causes an injury to an operator in the assembling process of the connectors.

Further, in this type of power supply structure, it is difficult to attach or detach the seat. To attach or detach the seat, the fastening of each connector under the seat should be released. If a person other than a professional operator attaches or detaches the seat, the person may easily injure his/her hand or like and wrongly connect connectors, which may cause malfunction of the seat. Further, it is not possible to attach or detach a seat which includes safety parts, such as a side airbag and a seatbelt reminder, and provides convenient functions, such as seat heating and ventilation.

The above information disclosed in this Background section is only for enhancement of understanding of the background of the disclosure and accordingly it may include information that does not form the prior art that is already known in this country to a person of ordinary skill in the art.

SUMMARY

The present disclosure has been made in an effort to solve the above-described problem associated with the related art.

An object of the present disclosure is to provide a seat power supply device capable of simplifying a seat power supply structure.

The object of the present disclosure is not limited to the aforementioned object, and the other objects not mentioned may be clearly understood by those with ordinary skill in the art to which the present disclosure pertains (hereinafter 'those skilled in the art') from the following description.

The features of the present disclosure for achieving the object of the present disclosure, and performing the characteristic functions of the present disclosure to be described later are as follows below.

In one aspect, the present disclosure provides a seat power supply device for a vehicle including a pogo pin assembly fixed to a vehicle and electrically connected to a power source, and a distribution element electrically connected to the pogo pin assembly and configured to supply power from the power source to an electronic part of a seat.

In another aspect, the present disclosure provides a seat power supply method for a vehicle including installing a housing of a pogo pin assembly on a floor of a vehicle, the housing being electrically connected to a battery for the vehicle, mounting a rail on the floor, and mounting a pogo pin on the rail so that the pogo pin is electrically connected to the housing, and mounting a seat for the vehicle on the rail, in which the rail is formed with a distribution element for electrically connecting the pogo pin to an electronic part of the seat.

The present disclosure provides the seat power supply device having a simplified seat power supply structure.

The effect of the present disclosure is not limited to the aforementioned effect, and the other effects not mentioned may be clearly recognized by those skilled in the art from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein:

FIG. 1 exemplarily illustrates a state where body wiring connectors and seat wiring connectors under a vehicle seat are fastened of the prior art;

FIG. 2 illustrates a state where a seat power supply device for a vehicle according to an exemplary embodiment of the present disclosure is installed on a seat for a vehicle;

Figure 3:
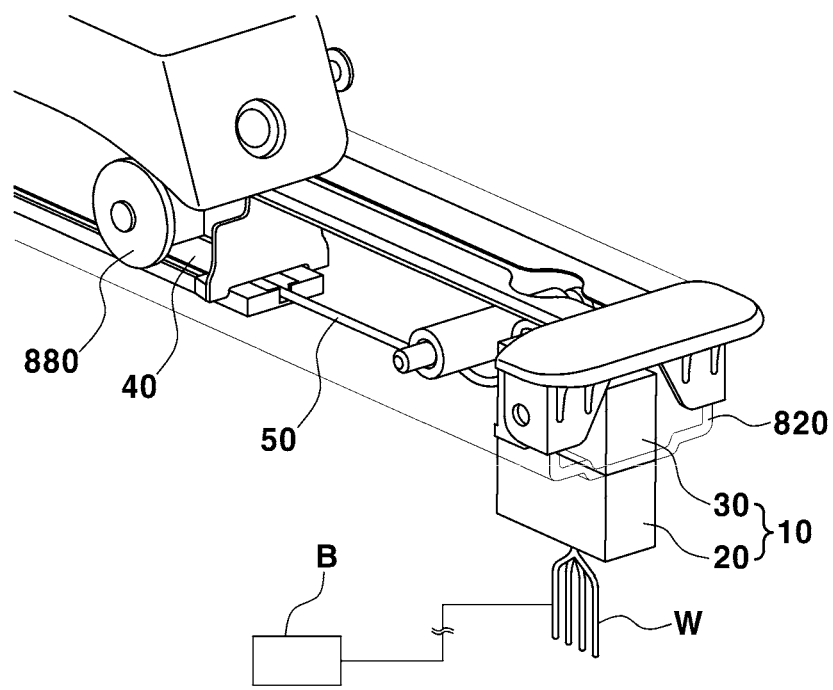
FIG. 3 is an enlarged perspective diagram of a left portion illustrated in FIG. 2.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

Referring to FIG. 2, a rail 800 of a vehicle seat (S) includes a lower rail 820 and an upper rail 840. The lower rail 820 is fixed to a vehicle body floor (F), and in some embodiments the lower rail 820 may be fixed by fastening a mounting bolt 860 to the floor (F). The lower rail 820 is coupled to the upper rail 840 such that the upper rail 840 is movable on the lower rail 820. The upper rail 840 mounts and supports a seat frame and is movably configured along the lower rail 820. Both sides of the upper rail 840 may be mounted with rollers 880 that roll along the lower rail 820.

As illustrated in FIG. 3, the seat power supply device according to the present disclosure includes a pogo pin assembly 10. According to an implementation example of the present disclosure, the pogo pin assembly 10 includes a housing 20 and a pogo pin 30.

The housing 20 is fixed to a vehicle, and more specifically, mounted on the vehicle body floor (F). The housing 20 is connected to a wiring (W) for the vehicle, and power is supplied from a battery (B), provided in the vehicle, through the wiring (W).

The pogo pin 30 is mounted on the lower rail 820. The pogo pin 30 is electrically connected to the housing 20 and the power through the housing 20 is delivered to the pogo pin 30. The pogo pin 30 and the housing 20 may be configured to be electrically conductive therebetween by connecting them.

The seat power supply device according to the present disclosure further includes a distribution element 40. The distribution element 40 is mounted on the lower rail 820 of the vehicle seat. The distribution element 40 is electrically connected to the pogo pin assembly 10, and configured to deliver the power, received from the pogo pin assembly 10, to electronic parts of the seat. As a non-limiting example, the distribution element 40 may be electrically connected to the pogo pin assembly 10 or the pogo pin 30 by a wire 50. According to the exemplary embodiment of the present disclosure, the distribution element 40 is a bus bar configured to be electrically connectable to the electronic parts, and preferably, may be made of a copper material.

Figure 4:
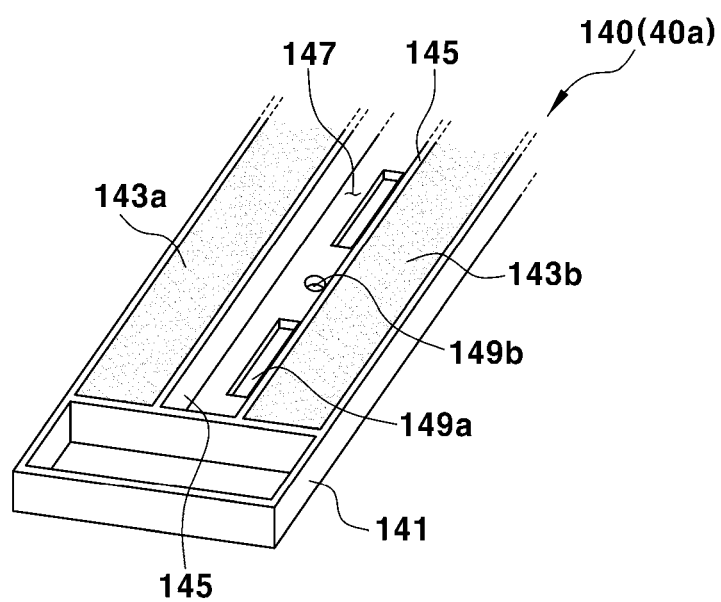
FIG. 4 illustrates an electrode plate assembly of a distribution element according to an implementation example of the present disclosure.
Figure 5:
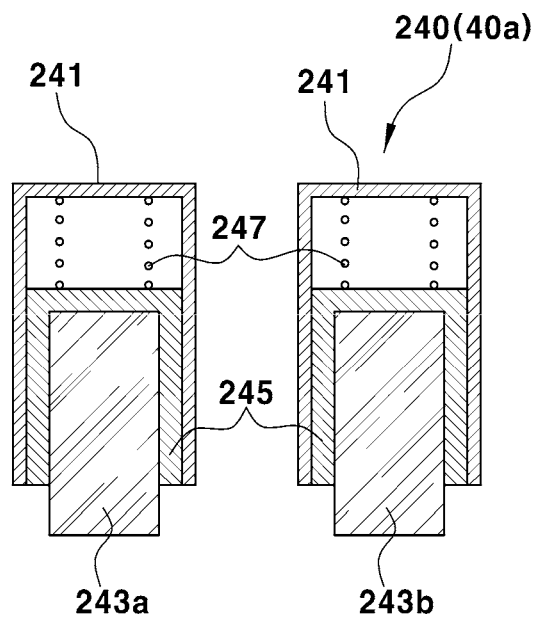
FIG. 5 illustrates a brush assembly of the distribution element according to the implementation example of the present disclosure.

Referring to FIGS. 4 and 5, according to some implementation examples of the present disclosure, a distribution element 40a may be configured to deliver power through the contact. To this end, the distribution element 40a may include an electrode plate assembly 140 and a brush assembly 240.

The electrode plate assembly 140 may be attached to an inner surface of any one of an upper plate, a side plate, and a lower plate of the lower rail 820. According to the implementation example of the present disclosure, the electrode plate assembly 140 includes an insulation cover 141 and a pair of electrode plates 143a, 143b.

As illustrated in FIG. 4, the insulation cover 141 is configured to have a length similar to a length of the lower rail 820, and an opened upper portion. The insulation cover 141 is made of a material capable of insulation.

The electrode plates 143a, 143b are inserted into both sides of the insulation cover 141, respectively, and both the electrode plates 143a, 143b are spaced apart from each other by a certain distance. The electrode plates 143a, 143b may be spaced apart and separated from each other by a pair of partition members 145.

The electrode plates 143a, 143b include a positive plate 143a and a negative plate 143b, and if the positive plate 143a is disposed on one side of the insulation cover 141, the negative plate 143b is disposed on the other side of the insulation cover 141. As a non-limiting example, the electrode plates 143a, 143b are manufactured in a bus bar structure using a copper material among conductive materials, and electrically connected to the pogo pin 30 or the pogo pin assembly 10. As a non-limiting example, the electrode plates 143a, 143b may be electrically connected to the pogo pin assembly 10 by the wire.

A bottom surface of a space 147 of the insulation cover 141 separated by the partition member 145 is provided with a plurality of drainage holes 149a. Each drainage hole 149a is configured to discharge moisture, foreign matters, and the like, flowing into the insulation cover 141, to the outside of the electrode plate assembly 140.

Further, the bottom surface of the space 147 of the insulation cover 141 separated by the partition member 145 is formed with a mounting hole 149b. The mounting hole 149b is configured such that a fastening member, such as a bolt, is inserted thereinto for the coupling with the lower rail 820.

As illustrated in FIG. 5, the brush assembly 240 is configured to receive power from the electrode plate assembly 140 or the electrodes plates 143a, 143b, and to supply the power to the electronic parts of the seat. The brush assembly 240 may be attached to any one of an upper plate, a side plate, and a lower plate of the upper rail 840 of the seat. According to the implementation example of the present disclosure, the brush assembly 240 includes a brush cover 241 and a pair of brushes 243a, 243b.

The brush cover 241 may be provided in a circular or quadrangular cylinder shape and mounted on any one of the upper plate, the side plate, and the lower plate of the upper rail 840.

The brushes 243a, 243b are each made of a conductive carbon material and accessibly inserted into the brush cover 241. Further, the brushes 243a, 243b conductively contact the electrode plates 143a, 143b. The pair of brushes 243a, 243b include a positive brush 243a and a negative brush 243b, in which the positive brush 243a is disposed on the brush cover 241 to contact the positive plate 143a, and the negative brush 243b is disposed on the brush cover 241 to contact the negative plate 143b.

According to the implementation example of the present disclosure, to protect the brushes 243a, 243b, each of the brushes 243a, 243b is mounted on a separate holder 245, and the holder 245 may also be accessibly inserted into the brush cover 241.

A spring 247 is interposed between the holder 245 and the brush cover 241 to be compressible such that lower ends of the brushes 243a, 243b fixed to the holder 245 protrude from the brush cover 241. An elastic restoring force of the spring 247 acts on the holder 245, such that the lower ends of the brushes 243a, 243b fixed to the holder 245 may protrude to the outside of the brush cover 241, and the protruding lower ends of the brushes 243a, 243b may always contact each electrode plate 143a, 143b to be conductive.

Therefore, as the brushes 243a, 243b electrically connected to the electronic parts of the seat always contact the electrode plates 143a, 143b electrically connected to the pogo pin assembly 10 to receive the power from the battery (B), the power may be supplied to the electronic parts.

Figure 6:
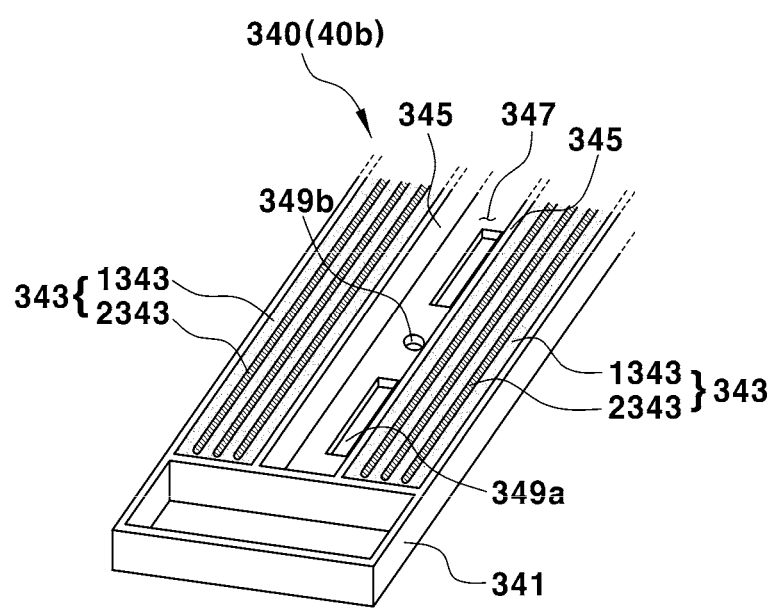
FIG. 6 illustrates a PCB assembly of the distribution element according to the implementation example of the present disclosure.
Figure 7:
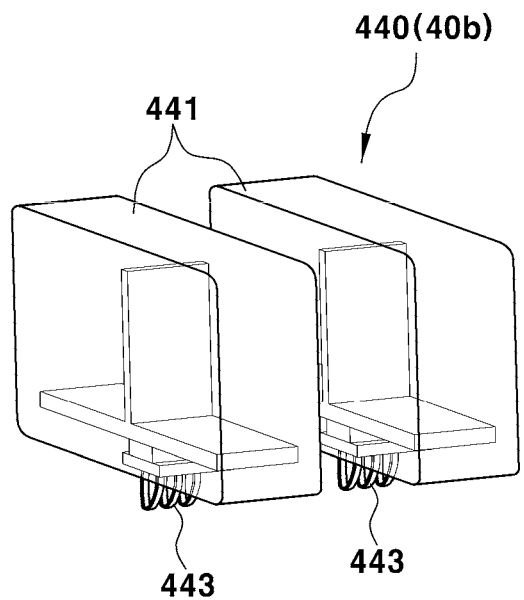
FIG. 7 illustrates a signal delivery assembly of the distribution element according to the implementation example of the present disclosure.

Referring to FIGS. 6 and 7, according to some implementation examples of the present disclosure, a distribution element 40b may be configured to receive the power and the signal from the pogo pin assembly 10 and to deliver the signal to the electronic parts through the contact. To this end, the distribution element 40b may include a PCB assembly 340 and a signal delivery assembly 440.

The printed circuit board (PCB) assembly 340 may be attached to the inner surface of any one of the upper plate, the side plate, and the lower plate of the lower rail 820. According to the implementation example of the present disclosure, the PCB assembly 340 includes an insulation cover 341 and a PCB 343.

As illustrated in FIG. 6, the insulation cover 341 is configured to have a length similar to the length of the lower rail 820, and an opened upper portion. The insulation cover 341 is made of a material capable of electrical insulation.

The PCBs 343 are inserted into both sides of the insulation cover 341, respectively, and both the PCBs 343 are spaced apart from each other by a certain distance. The PCBs 343 may be spaced apart and separated from each other by a pair of partition member 345. The PCB 343 is connected to the pogo pin assembly 10 which is a signal supply source. For example, the signal may also be supplied to the seat (S) by the pogo pin assembly 10 from an external controller or the like.

The PCB 343 is configured in a structure in which a conductive pattern 2343 made of a copper material is formed on an insulating resin layer 1343, and the conductive pattern 2343 may be electrically connected to the signal supply source (e.g., the pogo pin assembly 10). Further, the PCB 343 may be electrically connected to the pogo pin 30 or the pogo pin assembly 10 to receive the power from the battery (B).

A bottom surface of a space 347 of the insulation cover 341 separated by the partition member 345 is provided with a plurality of drainage holes 349a. Each drainage hole 349a is configured to discharge moisture, foreign matters, and the like, flowing into the insulation cover 341, to the outside of the PCB assembly 340.

Further, the bottom surface of the space 347 of the insulation cover 341 separated by the partition member 345 is formed with a mounting hole 349b. The mounting hole 349b is configured such that a fastening member is inserted thereinto for the coupling with the lower rail 820.

As illustrated in FIG. 7, the signal delivery assembly 440 is configured to receive the signal from the PCB assembly 340 and to deliver the input signal to the electronic parts of the seat. The signal delivery assembly 440 may be attached to any one of the upper plate, the side plate, and the lower plate of the upper rail 840 of the seat. According to the implementation example of the present disclosure, the signal delivery assembly 440 may include a casing 441 and a signal delivery terminal 443.

The casing 441 may be attached to any one of the upper plate, the side plate, and the lower plate of the upper rail 840.

The signal delivery terminal 443 is accommodated in the casing 441. A part of the signal delivery terminal 443 is configured to protrude to the outside of the casing 441 to contact the conductive pattern 2343 of the PCB 343, and configured to transmit a control signal to the electronic parts.

Therefore, the PCB 343 receives the power and the signal from the pogo pin assembly 10, and the signal delivery terminal 443 connected to the electronic parts always contacts the conductive pattern 2343 of the PCB 343 connected to the pogo pin assembly 10. Therefore, the control signal from the pogo pin assembly 10 may be transmitted to the electronic parts.

Figure 8:
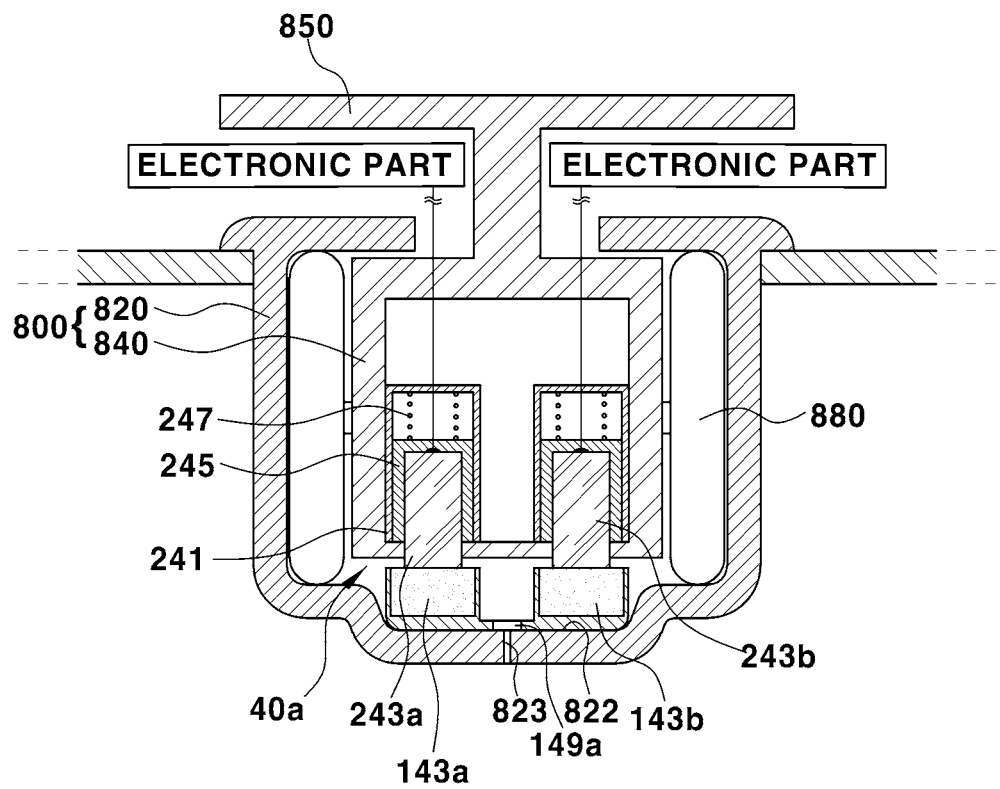
FIG. 8 illustrates an example of mounting the distribution element including the electrode plate assembly and the brush assembly according to the implementation example of the present disclosure.
Figure 9:
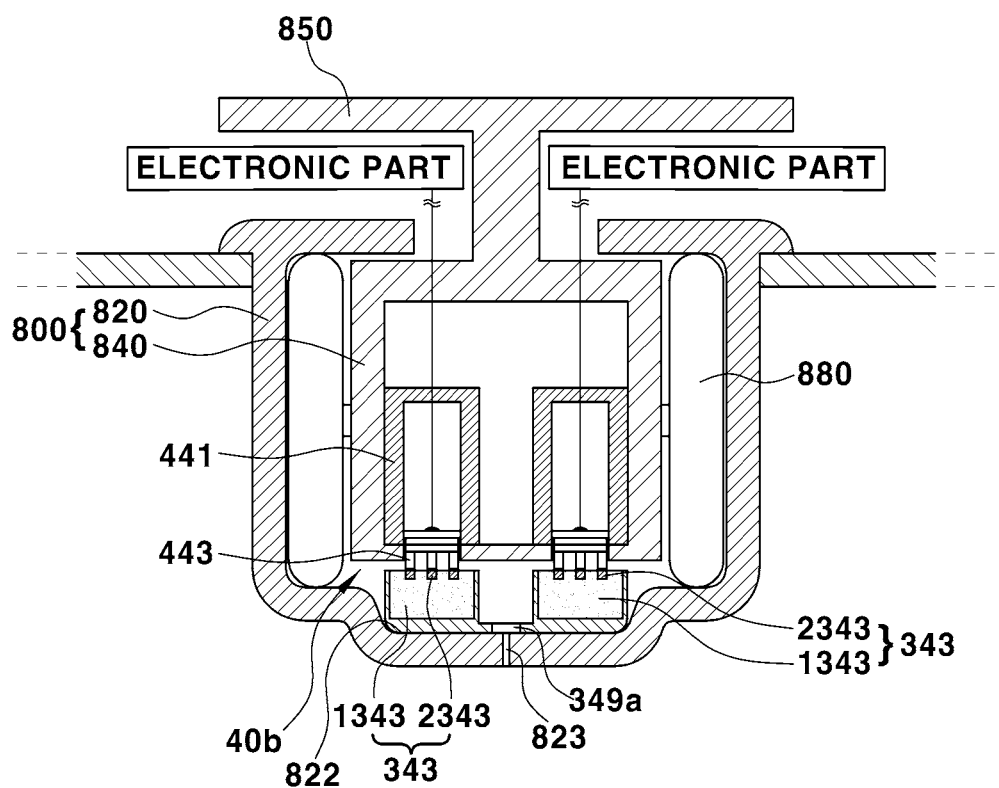
FIG. 9 illustrates an example of mounting the distribution element including the PCB assembly and the signal delivery assembly according to the implementation example of the present disclosure.

FIG. 8 is a cross-sectional diagram illustrating an example in which the distribution element 40a according to the present disclosure is mounted on one of the pair of rails 800, and FIG. 9 is a cross-sectional diagram illustrating an example in which the distribution element 40b according to the present disclosure is mounted on the other one of the pair of rails 800.

If the pair of rails are included in the left and right sides of the seat, respectively, the distribution element 40a may be mounted on any one side of the left and right sides (see FIG. 8), and the distribution element 40b may be mounted on the other side thereof (see FIG. 9).

As illustrated in FIG. 8, the insulation cover 141 is mounted on the lower plate of the lower rail 820, and the positive plate 143a and the negative plate 143b are disposed on both sides of the insulation cover 141, respectively. The brush cover 241 is mounted on the upper rail 840. The brushes 243a, 243b are elastically supported by the spring 247 accommodated in the brush cover 241 and configured such that the lower ends of the brushes 243a, 243b protrude through the lower portion of the brush cover 241. The lower ends of the positive brush 243a and the negative brush 243b maintain a state of contacting the positive plate 143a and the negative plate 143b, respectively, to be conductive.

The power is supplied from the battery (B) for the vehicle by the pogo pin assembly 10 electrically connected to the electrode plates 143a, 143b, and a current from the pogo pin assembly 10 is supplied to the electronic parts through the electrode plates 143a, 143b and then the brushes 243a, 243b even without a separate wiring. Therefore, the present disclosure may supply the power to the seat even without the fastening of the body wiring connector and the seat wiring connector.

Referring to FIG. 9, the insulation cover 341 is mounted on the lower plate of the lower rail 820, and the PCBs 343 are mounted on both sides of the insulation cover 341, respectively. The upper rail 840 is mounted with the casing 441, and the casing 441 accommodates the signal delivery terminal 443. A part of the signal delivery terminal 443 is positioned to protrude to the outside of the lower portion of the casing 441. The signal delivery terminal 443 always contacts the PCB 343 to transmit the signal from the conductive pattern 2343 of the PCB 343.

Therefore, the pogo pin assembly 10 receives the power from the battery (B) for the vehicle and supplies the power to the PCB 343 electrically connected to the pogo pin assembly 10. Further, the control signal and the like from the pogo pin assembly 10, which is the signal supply source, may be easily transmitted to the electronic parts through the PCB 343 and the signal delivery terminal 443 even without the separate wiring.

Figure 10:
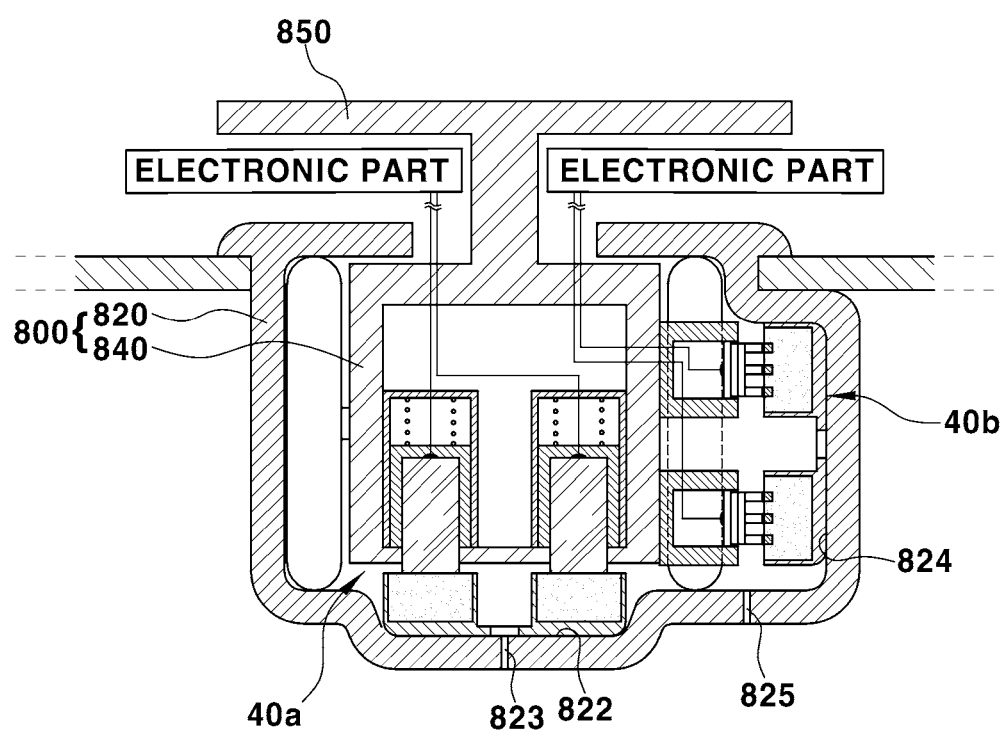
FIG. 10 illustrates an example of mounting the distribution elements according to the implementation example of the present disclosure.
Figure 11:
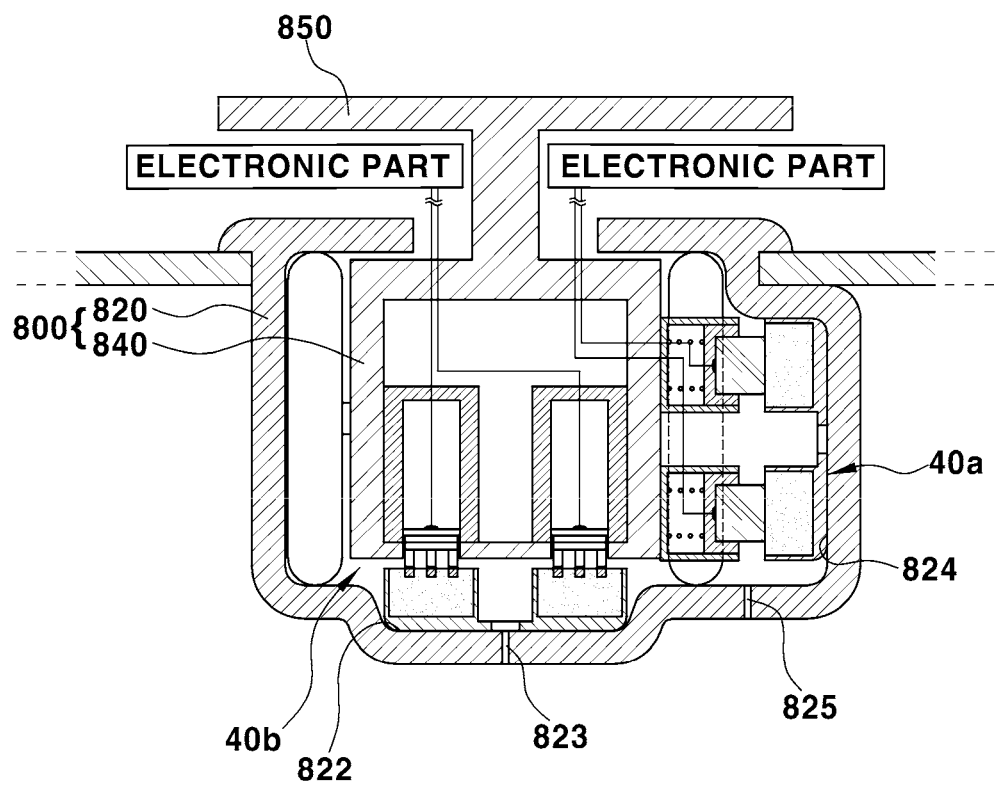
FIG. 11 illustrates another example of mounting the distribution elements according to the implementation example of the present disclosure.

As illustrated in FIGS. 10 and 11, if the seat rail adopts a monorail type having a long rail structure, the distribution element 40a for supplying the power and the distribution element 40b for delivering the signal may be mounted on one rail.

As illustrated in FIG. 10, the distribution element 40a for supplying the power may be mounted on the lower portion sides of the lower rail 820 and the upper rail 840, and the distribution element 40b for delivering the signal may be mounted on the left or right sides of the lower rail 820 and the upper rail 840.

Alternatively, as illustrated in FIG. 11, the distribution element 40a may be mounted on the left or right sides of the lower rail 820 and the upper rail 840, and the distribution element 40b may be mounted on the lower portion sides of the lower rail 820 and the upper rail 840.

According to the implementation example of the present disclosure, to mount the distribution element 40a or 40b, the lower plate of the lower rail 820 may be formed with a downward concave lower expansion space 822. According to the implementation example of the present disclosure, to mount the distribution element 40a or 40b, the side plate of the lower rail 820 may be formed with an outward convex side expansion space 824.

According to the implementation example of the present disclosure, the lower plate of the lower rail 820 may be formed with a drainage hole 823 for discharging moisture, and a bottom side of the side plate of the lower rail 820 may also be formed with a drainage hole 824 for discharging moisture.

Figure 12:
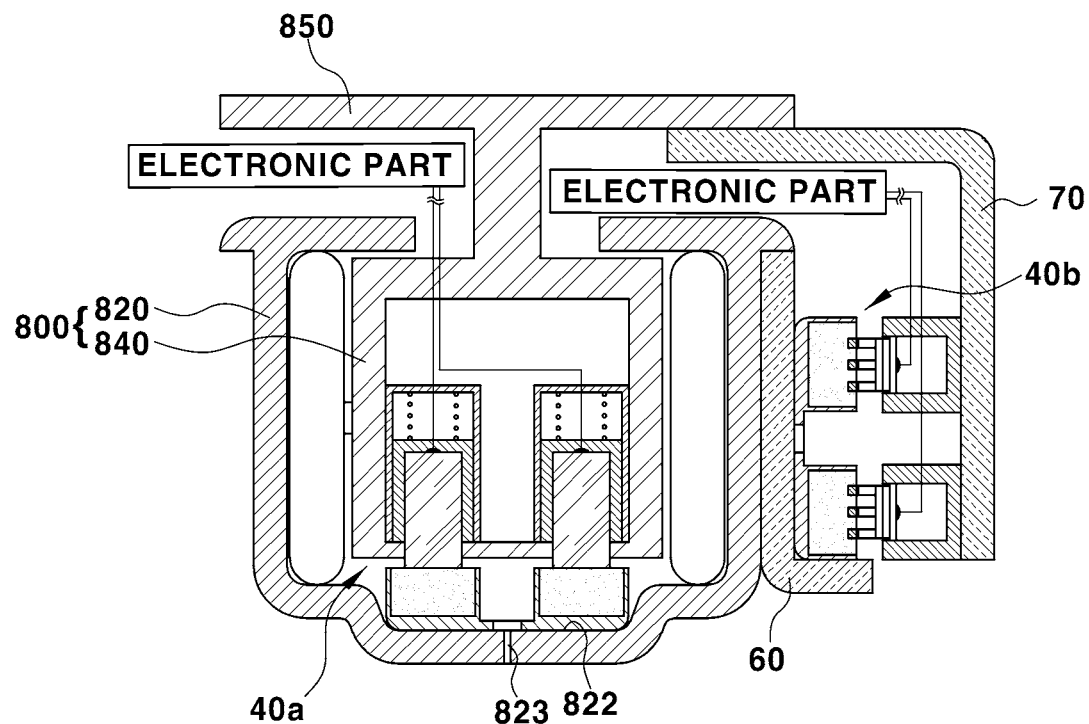
FIG. 12 illustrates still another example of mounting the distribution elements according to the implementation example of the present disclosure.
Figure 13:
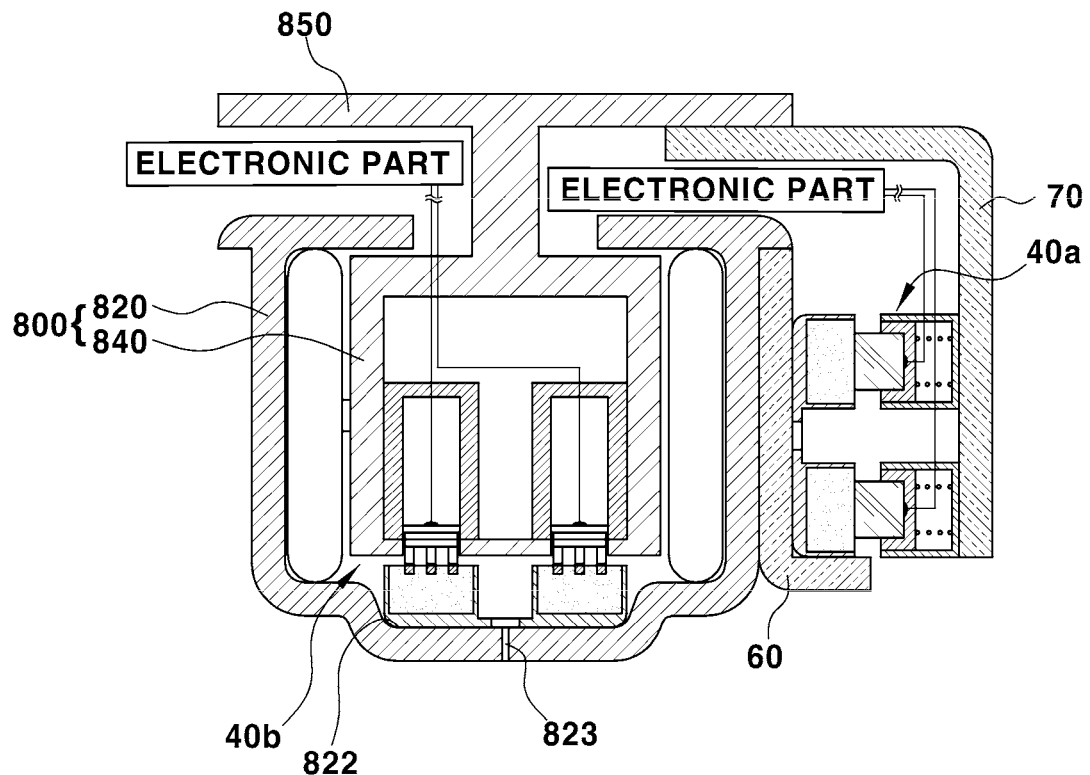
FIG. 13 illustrates yet another example of mounting the distribution elements according to the implementation example of the present disclosure.

As illustrated in FIGS. 12 and 13, according to some implementation examples of the present disclosure, the distribution elements 40a, 40b may be mounted on outside portions of the rails using a bracket.

To mount the distribution element 40a or 40b, an outer surface of the side plate of the lower rail 820 may be mounted with a first bracket 60, and a coupling plate 850 of the upper rail 840 may be mounted with a second bracket 70 facing the first bracket 60.

Therefore, a surface on which the first bracket 60 and the second bracket 70 face each other may be mounted with the distribution element 40a or 40b.

Referring to FIG. 12, when the surface on which the first bracket 60 and the second bracket 70 face each other is mounted with the distribution element 40a, the distribution element 40b may also be mounted on a surface on which the lower rail 820 and the upper rail 840 face each other.

Referring to FIG. 13, when the surface on which the first bracket 60 and the second bracket 70 face each other is mounted with the distribution element 40b, the distribution element 40a may also be mounted on the surface on which the lower rail 820 and the upper rail 840 face each other.

As described above, the present disclosure may supply at least one of the power and the signal to the vehicle seat (S) through the pogo pin assembly 10, thereby greatly simplifying a process of mounting the seat in the vehicle.

Figure 14:
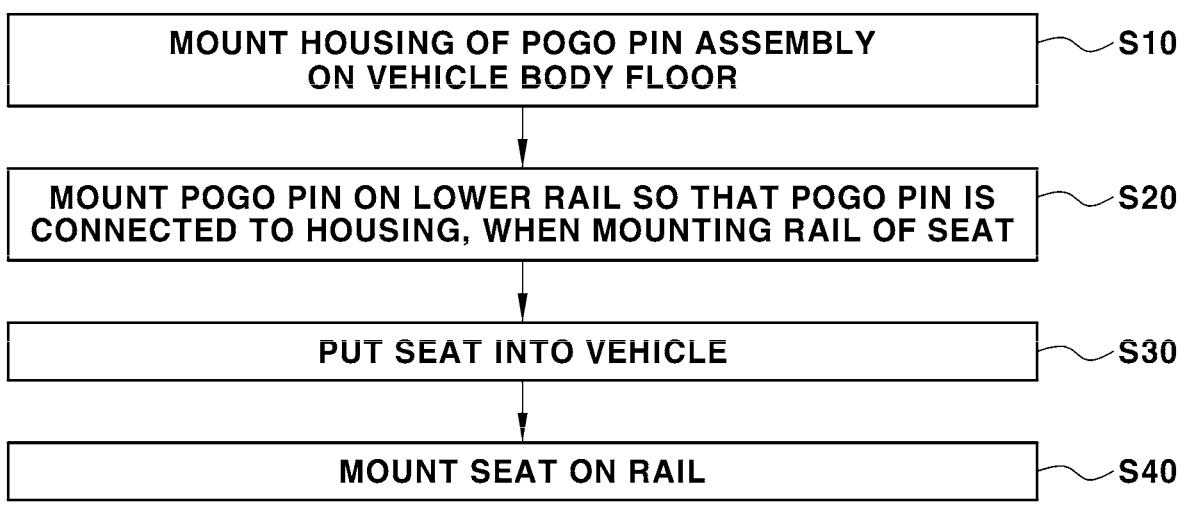
FIG. 14 illustrates a process of assembling a seat including the seat power supply device according to the exemplary embodiment of the present disclosure.

Referring to FIG. 14, a process of mounting a seat in a vehicle including the seat power supply device according to the present disclosure is as follows below.

The floor (F) for the vehicle is mounted with the housing 20 of the pogo pin assembly 10 electrically connected to the battery (B) at S10. Further, when the rail 800 of the seat (S) is mounted in the vehicle, the pogo pin 30 is installed on the lower rail 820 to be connected to the housing 20 at S20. Therefore, the pogo pin 30 is electrically connected to the housing 20, and mounted on the lower rail 820.

In such a state, to mount the seat (S), the seat (S) for the vehicle is put into the vehicle at S30. The seat (S) is mounted on the rail 800 at S40. At this time, the seat (S) may be mounted on the rail 800 through a fastening member, such as a bolt. As a result, it is possible to supply the power and the signal to the seat (S).

Figure 15:
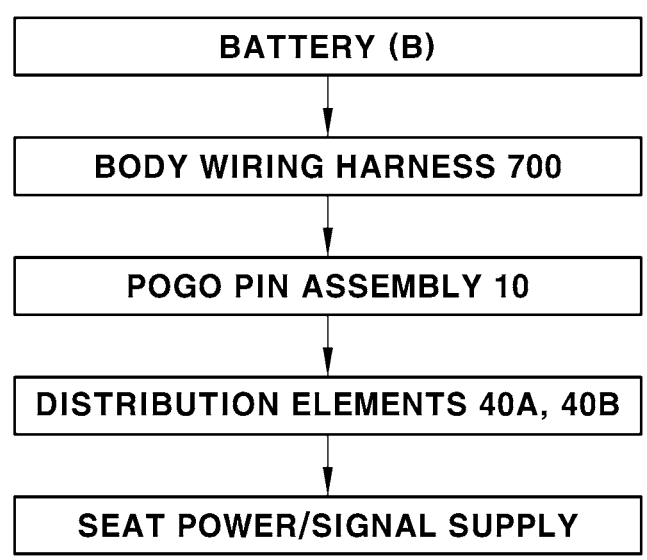
FIG. 15 illustrates a flowchart in which power or a signal is supplied to a seat in a vehicle including the seat power supply device according to the exemplary embodiment of the present disclosure.

Once the seat (S) is put into the vehicle and then seated on the rail 800, the present disclosure may supply the power and deliver the signal to the electronic parts of the seat (S) through the pogo pin assembly 10. In other words, as illustrated in FIG. 15, the power and/or the signal are supplied to the seat. The body wiring harness 700 electrically connected to the battery (B) for the vehicle is connected to the pogo pin assembly 10 installed on the vehicle body floor (F) of the portion where the seat (S) is installed. The power and the signal may be supplied to the electronic parts of the seat (S) through the distribution elements 40a, 40b electrically connected to the pogo pin assembly 10 by the wire or the like.

In other words, the present disclosure may omit the overall assembling step required upon fastening the connector. Specifically, a step of moving the seat to the left and the right to secure the view of an assembler, a step of turning over the seat wiring connector to secure the assembly of the connector, a step of fastening the connectors of the body wiring and the seat wiring, a step of rotating the seat wiring connector, having been rotated to secure the assembly, again to return to the original position and fixing the connector to the bracket, and a step of returning the seat, having moved to the left or the right to secure the view of the assembler, to the original position may be omitted. Therefore, the present disclosure may dramatically simplify the process of providing the structure for supplying the power to the seat.

Further, the present disclosure may omit the fastening of the connector between the body wiring and the seat wiring when supplying the power to the seat from the power source for the vehicle, thereby further expanding the movement area of the seat. In particular, the present disclosure may solve the package problem for exposing the wiring and setting the wiring path when implementing the long rail or the swivel seat.

The present disclosure may improve the space utilization in the vehicle interior, enhance the appearance quality, and easily attach or detach the vehicle seat. Further, the present disclosure may reduce the weight and the cost.

The aforementioned present disclosure is not limited by the aforementioned exemplary embodiments and the accompanying drawings, and it will be apparent to those skilled in the art that various substitutions, modifications, and changes may be made without departing the technical sprit of the present disclosure.

The invention claimed is:

1. A seat power supply device for a vehicle comprising:
a pogo pin assembly fixed with respect to a vehicle and electrically connected to a power source; and
a distribution element electrically connected to the pogo pin assembly and configured to supply power from the power source, transferred through the pogo pin assembly, to an electronic part of a seat.

2. The seat power supply device of claim 1, wherein the pogo pin assembly is further configured to receive a control signal from an external source and transmit the control signal to the electronic part through the distribution element.

3. The seat power supply device of claim 1, wherein the pogo pin assembly comprises a housing fixed to a vehicle body floor of the vehicle and connected to a battery of the vehicle.

4. The seat power supply device of claim 3, wherein the pogo pin assembly further comprises a pogo pin mounted on a lower rail of the vehicle seat and electrically connectable to the housing.

5. The seat power supply device of claim 4, wherein the distribution element is a bus bar mounted on the lower rail and electrically connected to the pogo pin.

6. The seat power supply device of claim 5, wherein the bus bar is made of a copper material.

7. The seat power supply device of claim 4, wherein the distribution element comprises an electrode plate assembly and a brush assembly each configured to connect the pogo pin assembly and the electronic part to be electrically conductive.

8. The seat power supply device of claim 7, wherein the electrode plate assembly comprises:
an insulation cover seated on the lower rail and having an opened upper portion; and
a positive plate and a negative plate disposed in the insulation cover and spaced apart from each other by a certain interval.

9. The seat power supply device of claim 8, wherein the brush assembly comprises a positive brush and a negative brush mounted on an upper rail configured to be movable along the lower rail, the positive brush and the negative brush being configured to maintain the connection with each of the positive plate and the negative plate.

10. The seat power supply device of claim 4, wherein the distribution element comprises a printed circuit board (PCB) assembly and a signal delivery assembly each configured to receive power and a control signal from the pogo pin assembly and to transmit the control signal to the electronic part.

11. The seat power supply device of claim 10, wherein the PCB assembly comprises:
an insulation cover seated on the lower rail and having an opened upper portion; and
a PCB accommodated in the insulation cover and comprising a conductive pattern.

12. The seat power supply device of claim 11, wherein the signal delivery assembly comprises a signal delivery terminal mounted on an upper rail configured to be movable along the lower rail, and configured to maintain the contact with the conductive pattern.

13. A seat power supply method for a vehicle, the method comprising:
installing a housing of a pogo pin assembly on a floor of a vehicle, the housing being electrically connected to a battery of the vehicle;
mounting a rail on the floor, and mounting a pogo pin on the rail so that the pogo pin is electrically connected to the housing; and
mounting a seat for the vehicle on the rail;
wherein the rail is formed with a distribution element electrically connecting the pogo pin to an electronic part of the seat.

14. The seat power supply method of claim 13, wherein the rail comprises:
a lower rail mounted on the floor, and being coupled to the pogo pin; and
an upper rail configured to be movable on the lower rail, and mounted to the seat.

15. The seat power supply method of claim 14, wherein the distribution element is a bus bar mounted on the lower rail and electrically connected to the pogo pin.

16. The seat power supply method of claim 14, wherein the distribution element is a printed circuit board mounted on the lower rail and electrically connected to the pogo pin.

* * * * *